United States Patent [19]

Kelley, Jr.

[11] 4,395,674
[45] Jul. 26, 1983

[54] REGULATING SYSTEM EMPLOYING AN RMS COMPOSITE CONTROLLER

[75] Inventor: Fred W. Kelley, Jr., Media, Pa.

[73] Assignee: General Electric Company, Philadelphia, Pa.

[21] Appl. No.: 333,962

[22] Filed: Dec. 23, 1981

[51] Int. Cl.³ .............................................. G05F 1/70
[52] U.S. Cl. .................................................. 323/210
[58] Field of Search ............... 323/207, 208, 209, 210, 323/211

[56] References Cited

U.S. PATENT DOCUMENTS

| 4,143,315 | 3/1979 | Kelley, Jr. | 323/210 |
| 4,339,705 | 7/1982 | Kelley | 323/210 |

Primary Examiner—William M. Shoop
Attorney, Agent, or Firm—John P. McMahon; William Freedman

[57] ABSTRACT

A regulating system for delivering a leading or lagging current to compensate for a load varying reactance is disclosed. The regulating system has an RMS composite controller for regulating the voltages at a critical area in a power system at which good voltage regulation is desired. In various embodiments the RMS composite controller has an arrangement to develop RMS quantities representative of the sequence components of the three phase power system. Each of the various RMS composite controllers provides an accurate control signal for the desired voltage regulation.

6 Claims, 5 Drawing Figures

REGULATING SYSTEM EMPLOYING AN RMS COMPOSITE CONTROLLER

BACKGROUND OF THE INVENTION

The present invention relates to supplying a compensating leading or lagging reactive type current to an A.C. electrical power system for stabilization of voltages, and more particularly, to a regulating system having an RMS composite controller system for the development of the compensating reactive current.

It is known that electric power systems which supply highly erratic reactive loads, e.g., electric arc furnaces, are typically characterized by poor voltage regulation. Locations on utility systems remote from the generation of the power also are typically characterized by poor voltage regulation. Compensating and regulating systems, herein simply referred to as regulating systems, which alleviate this condition are disclosed in several of my issued U.S. Patents including U.S. Pat. Nos. 4,143,315; 3,936,726; 3,926,727; and 4,121,150, all assigned to the assignee of the present invention. A further regulating system is described in my U.S. Patent Application Ser. No. 242,784, filed Mar. 11, 1981 and also assigned to the assignee of the present invention. The foregoing U.S. Patents and the Application are herein incorporated by reference into the present application.

U.S. Pat. No. 4,143,315 and U.S. Application Ser. No. 242,784 describe regulating systems for a three phase power system that exert individual control of each of the phase-to-phase voltages. By employing a common reference, the system voltages are regulated to be of equal value. Thus, the negative sequence component of voltage is regulated and the positive sequence component of voltage is also regulated to the desired value. The required rating of the reactive converter is the sum of the ratings required to regulate the negative sequence component and to regulate the positive sequence component for the disturbances or conditions encountered. The rating of the reactive converter is commonly termed "MVAR". The MVAR represents the magnitude of the rating and corresponds to the magnitude of available compensating reactive current typically derived from thyristor switched inductor circuits.

In some applications such as with utility power systems the negative sequence component is limited and is considered tolerable. In such cases the MVAR rating and therefore the cost of the reactive converter is reduced if it is supplied to only regulate the positive sequence component. To employ the regulating systems described by U.S. Pat. No. 4,143,315 or by U.S. Application Ser. No. 242,784 would consume reactive converter rating for the correction of the negative sequence component if such correction occurred and thus would decrease the rating available for correction of positive sequence disturbances. Thus, for these cases it is desired to regulate the positive sequence component only.

Accordingly, it is an object of this invention to provide a regulating system for supplying a leading or lagging reactive type current to a three phase power system to compensate for positive sequence disturbances.

Another object of this invention is to provide an accurate regulating system for accurately compensating for positive sequence disturbances.

A further object of the present invention, is to provide RMS composite control signals derived from the three phase quantities of the power system as means for correspondingly improving voltage regulation necessitated by power disturbances.

These and other objects of the present invention will become apparent to those skilled in the art upon consideration of the following description of the invention.

SUMMARY OF THE INVENTION

The present invention is directed to a regulating system coupled to a three phase power system at a critical area. The regulating system has reactive converters respectively coupled across each of the phase-to-phase voltages of the three phase power system for delivering a leading or lagging current to compensate for a load of varying reactance. The regulating system comprises: (a) means for developing a first signal representative of the R.M.S. value of the positive sequence component of the R.M.S. values of the phase-to-phase voltages of the three phase power system at the critical area; (b) means for developing second signals representative of desired voltage regulation levels of each of the phase-to-phase voltages of the three phase power at the critical area; (c) means responsive to the first and the second signals for developing error signals for the regulating system which are used to hold the first signal and second signals in close correspondence if within a desired range of the reactive converters; (d) comparison means for sensing non-correspondence between the first signal and each of the second signals, and developing in dependence upon the sensed non-correspondence command signals indicative of whether normal or transient conditions are present in the power system; (e) gating control means responsive to the command signals for supplying control signals for each of the reactive converters so as to regulate the voltage at the critical area both during normal and transient conditions; (f) a first, a second and a third arrangement, each comprising two circuit branches connected in parallel. Each branch comprises an inductor and a thyristor connected in series. The thyristors are oppositely poled and each of the thyristors provide a unidirectional path through its inductor. A capacitor is connected in parallel with each of the two branches. The first, second, and third arrangements of two circuit branches are respectively connected between the first and second, second and third, and third and first phases of the three phase power system; (g) the gating control means (1) for effecting the voltage regulation during normal conditions, causing each of thyristors of each of the first, second and third arrangements to have a conduction angle of 180 degrees or less in response to the comparison means sensing the presence of normal power conditions in the power system, and (2) for effecting the voltage regulation during transient conditions, causing each of the thyristors to have a conduction angle of greater than 180 degrees in response to the comparison means sensing the presence of transient power conditions in the power system.

The features of the invention believed to be novel are set forth with particularity in the appended claims. The invention, itself, however, both as to its organization and method of operation, together with further objects and advantages thereof may best be understood by reference to the following description taken in conjunction with the accompanying drawings.

DETAILED DESCRIPTION OF THE INVENTION

Figure 1:
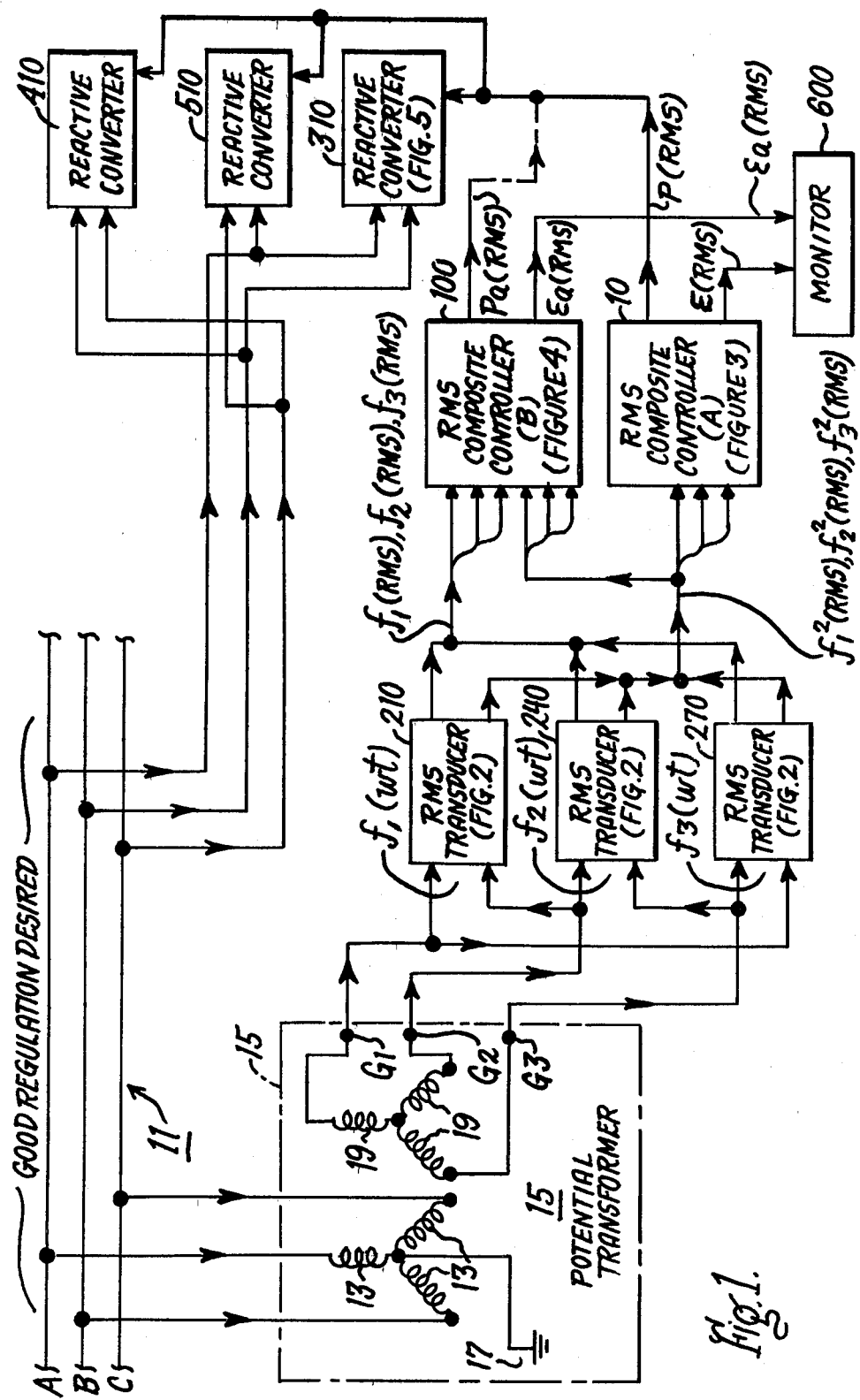
FIG. 1 is a block diagram showing the overall operation of the present invention.

FIG. 1 is a block diagram in accordance with the present invention. FIG. 1 shows a critical area 11 of the power system (not shown) in which good voltage regulation is desired. FIG. 1 further shows a potential transformer 15 connected to phases A, B, and C of the power system. The illustrated potential transformer 15 comprises; primary windings 13 connected in wye across the phase conductors A, B, and C and having a grounded common neutral 17. The potential transformer 15 further has a wye-connected secondary winding 19 having output terminals G1, G2, and G3. Potential transformer 15 develops signals, via output terminals G1, G2 and G3, $f_1(\omega t)$, $f_2(\omega t)$, $f_3(\omega t)$, respectively, representative of the phases A-B, phases B-C, and phases C-A voltages at the critical area 11.

The three signals $f_1(\omega t)$, $f_2(\omega t)$, and $f_3(\omega t)$ are respectively applied to RMS transducers 210, 240, and 270. The RMS transducers 210, 240, and 270 respectively develop two types of R.M.S. signals, $f_1$ (R.M.S.) and $f_1^2$ (R.M.S.), $f_2$ (R.M.S.) and $f_2^2$ (R.M.S.), and $f_3$ (R.M.S.) and $f_3^2$ (R.M.S.). The term R.M.S. is the root-mean-square quantity of the phase-to-phase voltage. In a first embodiment of the invention, the developed signals $f_1^2$ (R.M.S.), $f_2^2$ (R.M.S.) and $f_3^2$ (R.M.S.) are applied to RMS COMPOSITE CONTROLLER (A) 10. In a second embodiment of the present invention, the developed signals $f_1^2$ (R.M.S.), $f_2^2$ (R.M.S.) and $f_3^2$ (R.M.S.) are also applied to RMS COMPOSITE CONTROLLER (B) 100. The R.M.S. signals $f_1$ (R.M.S.), $f_2$ (R.M.S.) and $f_3$ (R.M.S.) are only applied to the RMS COMPOSITE CONTROLLER (B) 100.

As will be described hereinafter, the RMS COMPOSITE CONTROLLER (A) 10 develops the quantities P (R.M.S.) and $\epsilon$ (R.M.S.). Similarly, the RMS Composite Controller (B) 100 develops the quantities $P_a$ (R.M.S.) and $\epsilon_a$ (R.M.S.) quantities. The $\epsilon$ (R.M.S.) and $\epsilon_a$ (R.M.S.) quantities are routed to a device 600 which provides a monitoring function of these quantities. The quantity P (R.M.S.) or the quantity $P_a$ (R.M.S.) is applied to a reactive converter 310. The reactive converter 310 has a thyristor switched inductor circuit for delivering a leading or a lagging current across phases A and B of the power system to compensate for a load in the power system of varying reactance. The quantity P (R.M.S.) or the quantity $P_a$ (R.M.S.) is also applied to reactive converters 410 and 510, each having a thyristor switched inductor circuit similar to reactive converter 310, and each delivering leading or lagging compensating currents which are applied respectively across phases B-C and phase C-A of the power system.

The circuit arrangement 10 of FIG. 1 provides a regulating system having reactive converters 310, 410 and 510 each delivering a leading or lagging current to their respective phase-to-phase circuit connections to compensate for a load of varying reactance. The RMS transducers 210, 240, and 270 provide means for developing signals representative of the actual RMS value of the respective phase-to-phase voltages of a three phase power system at a critical area 11 for which good voltage regulation is desired.

Each of the RMS COMPOSITE CONTROLLERS (A) 10 and (B) 100 comprises means responsive to the output signals of the RMS transducers 210, 240 and 270 for developing a first signal representative of the R.M.S. value of the positive sequence component of the R.M.S. values of the phase-to-phase voltages of the three phase power system at the critical area 11.

As will be further described in connection with FIG. 5, each of the reactive converters 310, 410 and 510 provide means, such as 334, 336 and 346 of FIG. 5, for developing a second signal representative of a desired voltage regulation level of the three phase power at the critical area. Each of the reactive converters 310, 410, and 510 further comprises means responsive to said first and second signals for developing an error signal, such as $V_{IN}$ of reactive converter 310, for the regulating system which are used to hold the first signal and the second signals in close correspondence if within a desired range of the reactive converters 310, 410 and 510. Each of the reactive converters 310, 410 and 510 further includes comparison means, such as 338–344, 352, and 356–362, for sensing the non-correspondence between the first and second signals and developing in dependence upon said non-correspondence a command signal, such as 325 of FIG. 5, indicative of whether normal or transient conditions are present in the power system. Still further, each of the reactive converters 310, 410 and 510 include gating control means, such as 318 of FIG. 5, responsive to the command signal 325 for supplying a control signal 322 to the thyristor inductor circuit, such as 320 of FIG. 5, so as to regulate the three phase voltage at the critical area both during normal and transient conditions.

The reactive converters 310, 410, and 510 respectively comprise a first, a second and a third arrangement of two circuit branches connected in parallel. Each of the branches comprising an inductor and a thyristor connected in series. The thyristors, such as T1 and T2 of FIG. 5, are oppositely poled and each of the thyristors provides a unidirectional path through its inductor and a capacitor connected in parallel with the two branches. The first, second, and third arrangements of reactive converters 310, 410 and 510, are respectively connected between phase A and phase B, phase B and phase C, and phase C and phase A of the three phase power system.

Figure 5:
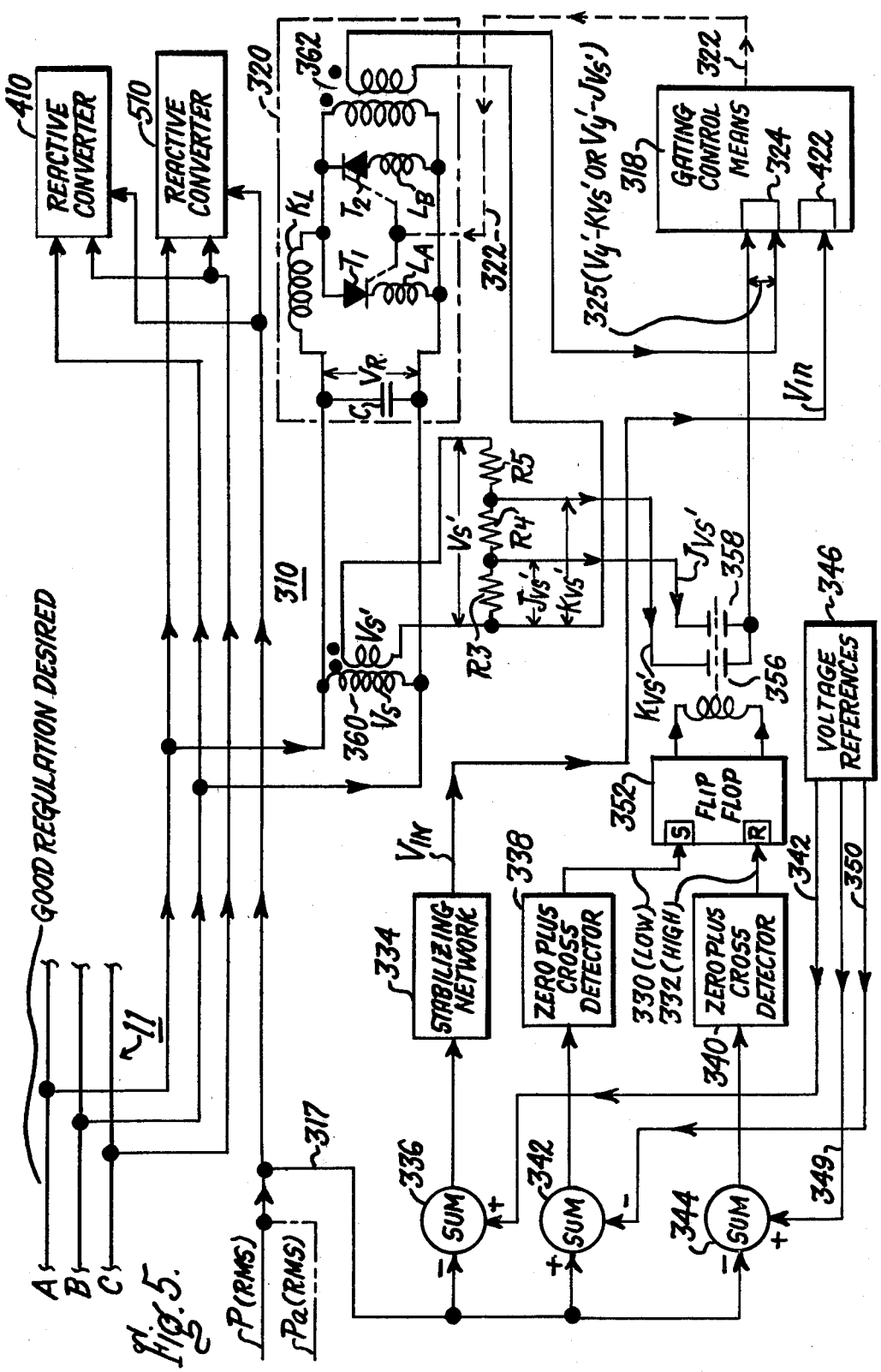
FIG. 5 is a block diagram showing the reactive converters of FIG. 1.

Each of the reactive converters 310, 410, and 510 includes the gating control means, such as 318 of FIG. 5, for effecting the voltage regulation during normal conditions by causing each of thyristors of the reactive converters 310, 410, and 510 to have a conduction angle of 180 degrees or less in response to the comparison means, such as 338–344, 352 and 356–362, sensing the presence of normal power conditions in the power system. Each of the reactive converters 310, 410 and 510 also effect the voltage regulation during transient conditions, by causing each of the thyristors to have a conduction angle of greater than 180 degrees in response to the comparison means sensing the presence of transient power conditions in the power system.

Figure 2:
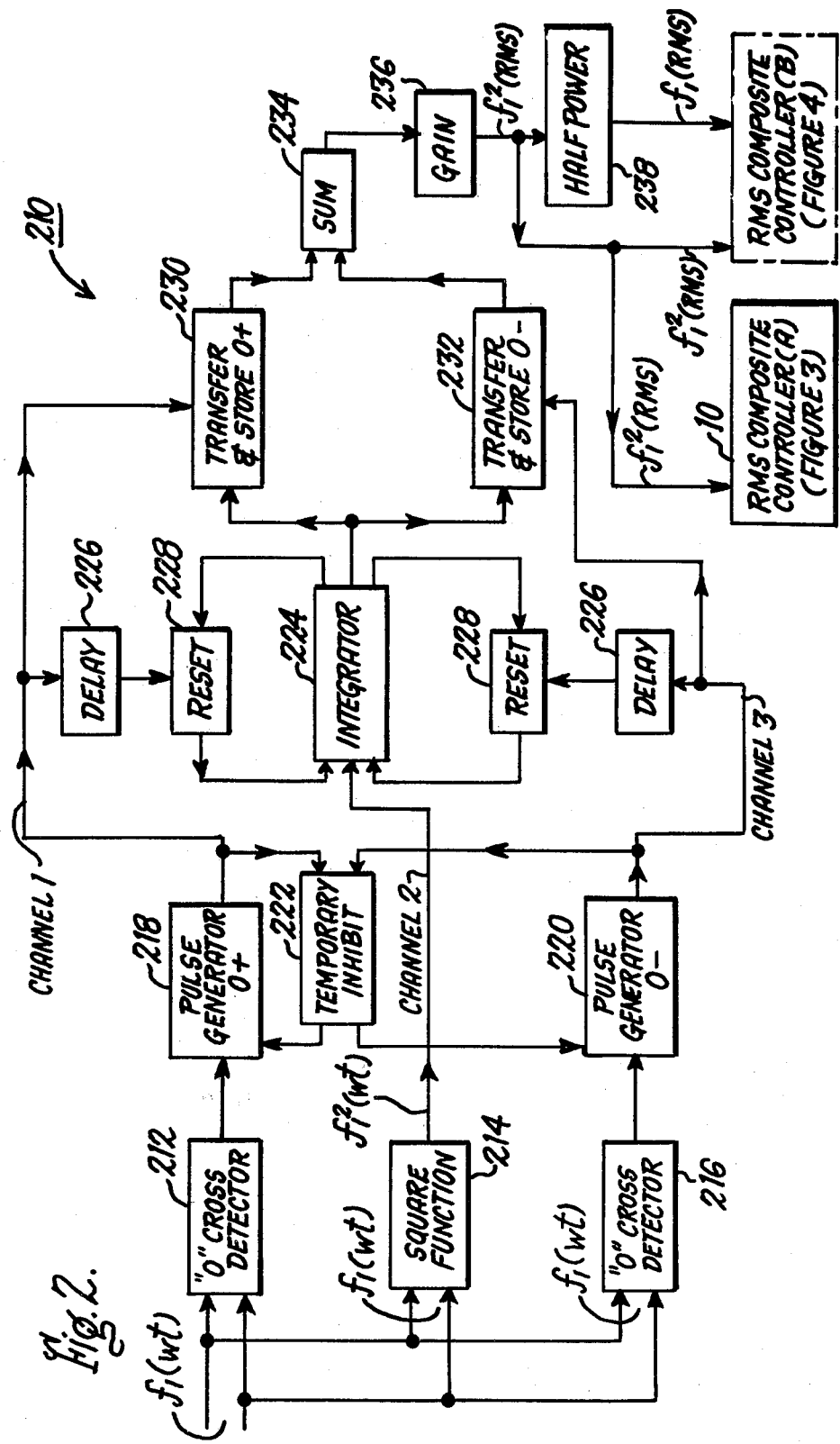
FIG. 2 is a block diagram of the RMS transducer shown in FIG. 1.

Reference is now made to FIG. 2 to describe the RMS transducers 210, 240 and 270. FIG. 2 shows a circuit arrangement for the RMS TRANSDUCER 210 which is also the circuit arrangement for the RMS TRANSDUCERS 240 and 270 with the exception the RMS TRANSDUCERS 240 and 270 have the signal $f_2$ ($\omega t$) and $f_3$ ($\omega t$), respectively, applied as their input signal. The circuit arrangement of FIG. 2 is substantially identical to my previous circuit arrangement of FIG. 1 of U.S. Pat. No,. 4,143,315 previously incorporated by reference hereinbefore. The circuit operation of each of the elements 212, 214, 216, 218, 220, 222, 224, 226, 228, 230, 232, 234, 236, and 238 of FIG. 2 is as respectively described for elements 12, 14, 16, 18, 20, 22, 24, 26, 28, 30, 32, 34, 36 and 38 of FIG. 1 of my U.S. Pat. No. 4,143,315.

The RMS TRANSDUCER 210 develops the signal $f_1^2$ (R.M.S.) at the output of the element GAIN 236. The signal $f_1^2$ (R.M.S.) is routed to both the RMS COMPOSITE CONTROLLER (A) 10 and the RMS COMPOSITE CONTROLLER (B) 100. The RMS TRANSDUCER 210 also develops the signal $f_1$ (R.M.S.) at the output of the element HALF POWER 238. The signal $f_1$ (R.M.S.) is routed to the RMS COMPOSITE CONTROLLER (B) 100. Similarly the RMS TRANSDUCERS 240 and 270 respectively develop signals $f_2$ (R.M.S.)−$f_2^2$ (R.M.S.) and $f_3$ (R.M.S.)−$f_3$ (R.M.S.) which are also applied to RMS COMPOSITE CONTROLLER (A) 10 and RMS COMPOSITE CONTROLLER (B) 100 in a manner as described for RMS TRANSDUCER 210. The signals $f_1^2$ (R.M.S.), $f_2^2$ (R.M.S.) and $f_3^2$ (R.M.S.) are respectively the squared quantity of the signals $f_1$ (R.M.S.) $f_2$ (R.M.S.) and $f_3$ (R.M.S.). The RMS transducers 210, 240 and 270 provide the RMS COMPOSITE CONTROLLER (A) 10 and the RMS COMPOSITE CONTROLLER (B) 100 with the source signals so as to develop the desired RMS control type signals of the present invention. The RMS COMPOSITE CONTROLLER (A) 10 is shown in FIG. 3 whereas the RMS COMPOSITE CONTROLLER (B) 100 is shown in FIG. 4.

Figure 3:
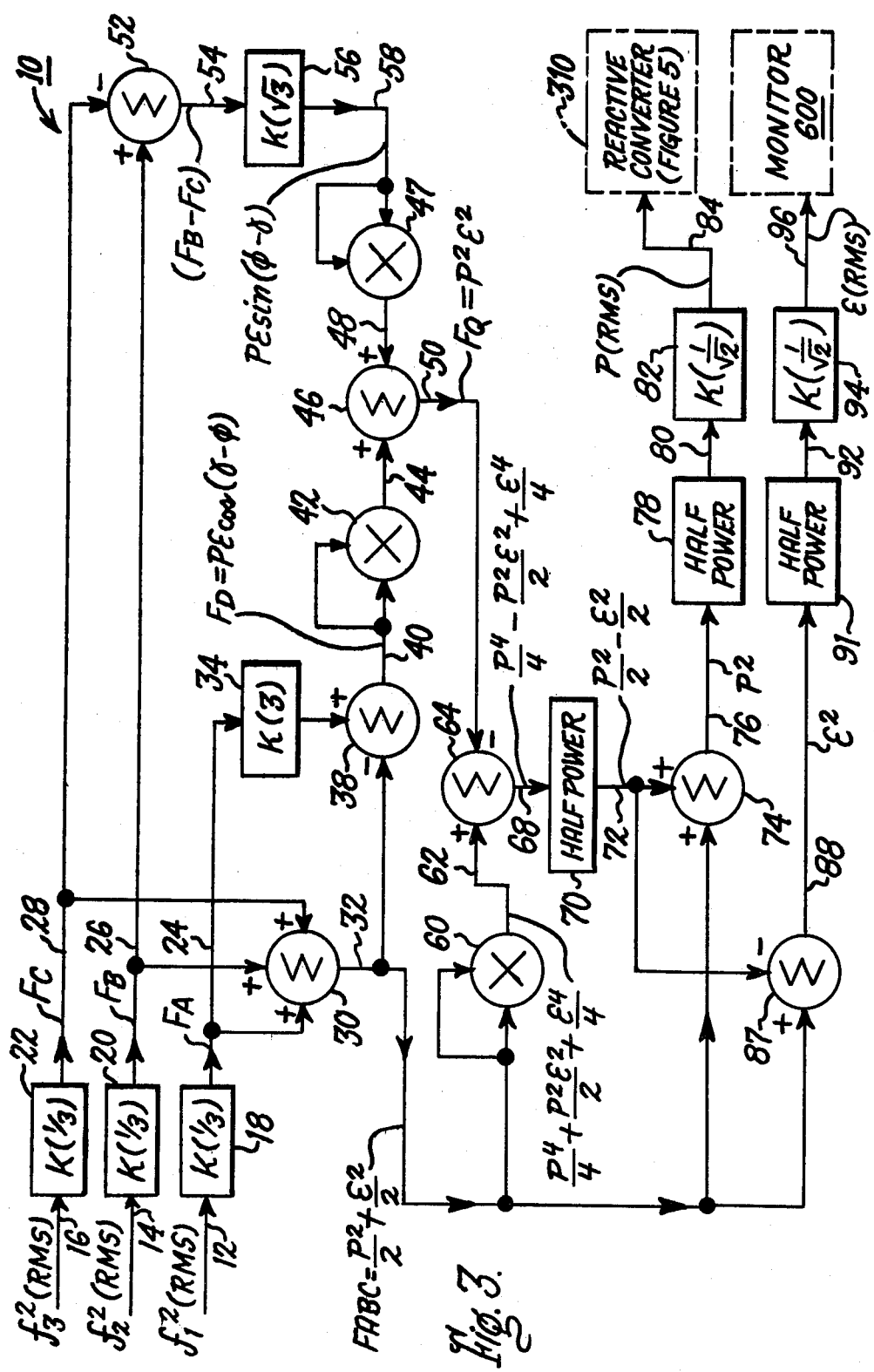
FIG. 3 is a block diagram of a circuit arrangement for developing RMS values of the positive and negative sequence components of the composite signals of the power system for regulation control and monitor purposes respectively.
Figure 4:
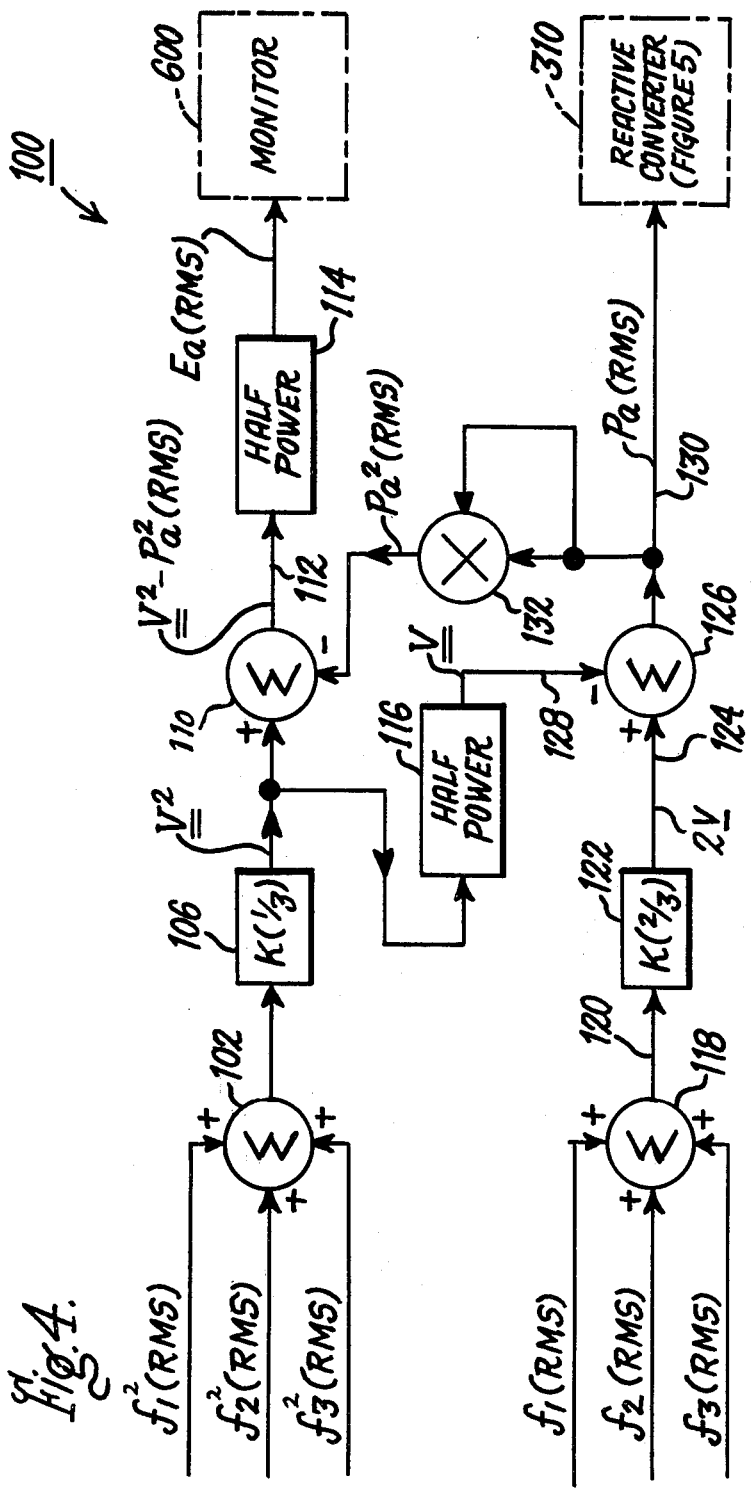
FIG. 4 is an alternate embodiment of the present invention for developing approximation RMS values of the positive and negative sequence components of the composite signals of the power system for regulation control and monitor purposes respectively.

The RMS COMPOSITE CONTROLLER (A) 10 of FIG. 3 has a plurality of conventional circuit elements whose reference numbers along with the circuit function performed are listed in Table 1.

TABLE 1

| Elements | Function |
| --- | --- |
| 30, 38, 42, 52, 64, 74, and 87 | Summer |
| 42, 47, and 60 | Multiplier |
| $18\left(K\left(\frac{1}{3}\right)\right), 20\left(K\left(\frac{1}{3}\right)\right),$ | Scaler |
| $22\left(K\left(\frac{1}{3}\right)\right), 34\,(K\,(3)),$ | |
| $20\left(K\left(\frac{1}{3}\right)\right), 22\left(K\left(\frac{1}{3}\right)\right),$ | |
| $56\ K\sqrt{3}\ , 82\ K\ 1\sqrt{2}\ ,$ | |
| and $94\left(K\left(\frac{1}{\sqrt{2}}\right)\right)$ | |

TABLE 1-continued

| Elements | Function |
| --- | --- |
| 70, 78, 91 | Half Power |

The scalers of Table 1 have a scaling constant shown within their respective brackets.

The Half Power elements 70, 78, and 91 of Table 1 may be of the type described for Half Power element 38 of my U.S. Pat. No. 4,143,315.

The circuit arrangement 10 having the applied signal operates so as to develop the two output signals P (R.M.S.) and $\epsilon$ (R.M.S.) The output signals P (R.M.S.) and $\epsilon$ (R.M.S.) comprise, respectively, positive and negative sequence components of the three (3) phase voltages at the critical area 11. The three (3) phase voltage as previously described are represented in FIG. 1 as $f_1$ ($\omega t$), $f_2$ ($\omega t$), and $f_3$ ($\omega t$) may be expressed in terms of their positive (P) and negative ($\epsilon$) sequence components by the following relationships:

$$f_1(\omega t) = P\underline{/\gamma} + \epsilon\underline{/\phi} \tag{1}$$

$$f_2(\omega t) = P\underline{/\gamma - 2\pi/3} + \epsilon\underline{/\phi + 2\pi/3} \tag{2}$$

$$f_3(\omega t) = P\underline{/\gamma + 2\pi/3} + \epsilon\underline{/\phi - 2\pi/3} \tag{3}$$

where $\gamma$ is the angle related to the positive sequence component P and $\phi$ is the angle related to the negative sequence component $\epsilon$.

The functions $f_1$ ($\omega t$), $f_2$ ($\omega t$) and $f_3$ ($\omega t$) of equations (1), (2) and (3) may further be respectively expressed by the following relationships (4), (5) and (6);

$$f_1(\omega t) = [P\sin(\omega t + \gamma) + \epsilon\sin(\omega t + \phi)] \tag{4}$$

$$f_2(\omega t) = [P\sin(\omega t + \gamma - 2\pi/3) + \epsilon\sin(\omega t + \phi + 2\pi/3)] \tag{5}$$

$$f_3(\omega t) = [P\sin(\omega t + \gamma + 2\pi/3) + \epsilon\sin(\omega t + \phi - 2\pi/3)] \tag{6}$$

The function $f_1$ ($\omega t$) of equation (4) may further be expressed as:

$$f_1(\omega t) = [(P\cos\gamma + \epsilon\cos\phi)\sin\omega t + (P\sin\gamma + \epsilon\sin\phi)\cos\omega t] \tag{7}$$

The R.M.S. value of the function of equation (7) may be expressed by the following relationship:

$$f_1(R.M.S.) = \frac{1}{\sqrt{2}}[(P\cos\gamma + E\cos\phi)^2 + (P\sin\gamma + E\sin\phi)^2]^{\frac{1}{2}} \tag{8}$$

The square function of equation (8) may be expressed by the following relationship:

$$f_1^2(R.M.S.) = \frac{1}{2}[(P^2 + 2PE(\cos\gamma\cos\phi + \sin\gamma\sin\phi) + E^2] \tag{9}$$

The square function of the R.M.S. quantities related to phases B-C and phase C-A voltage at the critical area 11 may be expressed in a similar manner as given for equations (7), (8), and (9), and have the following relationships:

$$f_2^2 (R.M.S.) = \frac{1}{2} [(P^2 + PE(\sqrt{3} \cos\gamma \sin\phi - \qquad (10)$$

$$\sqrt{3} \sin\gamma \cos\phi - \sin\gamma \sin\phi - \cos\gamma \cos\phi) + E^2]$$

$$f_3^2 (R.M.S. = \frac{1}{2} [P^2 + PE(\sqrt{3} \sin\gamma \cos\phi - \qquad (11)$$

$$\sqrt{3} \cos\gamma \sin\phi - \sin\gamma \sin\phi - \cos\gamma \cos\phi) + E^2].$$

The signals represented by equations (9), (10) and (11) are shown in FIG. 3 as respectively applied to a first, a second, and third scaler means 18, 20, and 22 via signal paths 12, 14, and 16 respectively. The signals represented by equations (9), (10) and (11) may be expressed as:

$$f_1^2 (R.M.S.) = 3F_A \qquad (12)$$

$$f_2^2 (R.M.S.) = 3F_B \qquad (13)$$

$$f_3^2 (R.M.S.) = 3F_C \qquad (14)$$

The signal $f_1^2$ (R.M.S.), $f_2^2$ (R.M.S.) and $f_3^2$ (R.M.S.) have been respectively expressed in terms of $3F_A$, $3F_B$ and $3F_C$ so as to simplify the description of the circuit arrangement 10 of FIG. 3. However, the hereinafter description of the operation of the circuit arrangement 10 relies upon the trigonometric quantities of equations (12), (13) and (14) which have been given in equations (1) through (11).

The scaler 18, 20 and 22 respectively develop signals $F_A$, $F_B$ and $F_C$. The signals $F_A$, $F_B$ and $F_C$ are each applied to positive inputs of a first summer means 30 which develops an output on signal path 32 shown as $F_{ABC}$ which is the sum of $F_A$, $F_B$, and $F_C$. The signal $F_{ABC}$ using the trigonometric functions previously given for signals $F_A$, $F_B$, and $F_C$ may be expressed as:

$$F_{ABC} = \frac{P^2}{2} + \frac{E^2}{2}. \qquad (15)$$

The signals $F_B$ and $F_C$ are also respectively routed to the positive and negative input of a second summer means 52. The output of summer 52 is applied to the input of scaler 56, via signal path 54 shown as having a signal ($F_B - F_C$). Scaler 56 develops output signal $\sqrt{3}$ [$F_B - F_C$] which may be expressed as:

$$\sqrt{3} [F_B - F_C] = PE \sin(\phi - \gamma) \qquad (16)$$

The signal $F_A$ is also applied to fourth scaler means 34 which develops an output signal $3F_A$. The signal $3F_A$ is applied to the positive input of a third summer means 38 which has applied to its negative input the signal on path 32 previously given as $F_A + F_B + F_C$. Summer 38 develops an output signal $F_D$ expressed by the relationship:

$$F_D = [3F_A - (F_A + F_B + F_C)] \qquad (17)$$

The relationship of equation (17) may also be expressed as:

$$F_D = P\epsilon \cos(\gamma - \phi) \qquad (18)$$

The signal $F_D$ of equations (17) and (18) is applied to a first multiplier means 42 which develops an output $(3F_A - (F_A + F_B + F_C))^2$ on signal path 44 that is applied to the positive input of a fourth summer means 46. Similarly the signal $\sqrt{3}$ [$F_B - F_C$] of equation 16 is applied to a second multiplier means 47 which develops an output signal $(\sqrt{3} [F_B - F_C])^2$ on signal path 48 that is applied to the positive input of summer 46. The operation of summer 46 in its development of the output on signal ($F_Q$) on path 50 may best be expressed by the following relationships:

$$F_Q = (\sqrt{3} [F_B - F_C])^2 + (3F_A - (F_A + F_B + F_C))^2 = P^2E^2 \qquad (19)$$

The signal $F_Q$ of expression (19) is applied to the negative input of a fifth summer means 64. Similarly, the signal $F_{ABC}$ of expression (15) is applied to a third multiplier means 60 which produces a signal on signal path 62 which is routed to the positive input of summer 64. The signal on signal path 62 is expressed by the relationship:

$$F_{ABC}^2 = \frac{P^4}{4} + \frac{P^2E^2}{2} + \frac{E^4}{4} \qquad (20)$$

The operation of summer 64 having the negative input of expression (19) and the positive input of expression (20) develops an output signal given by the expression:

$$F_{ABC}^2 - F_Q = \frac{P^4}{4} + \frac{P^2E^2}{2} + \frac{E^4}{4} - P^2E^2 \qquad (21)$$

$$= \frac{P^4}{4} - \frac{P^2E^2}{2} + \frac{E^4}{4}$$

The signal given by expression (21) is applied to a first half power means which is element HALF POWER 70 which develops an output signal on path 72 given by the expression:

$$[F_{ABC}^2 - F_Q]^{\frac{1}{2}} = \frac{P^2}{2} - \frac{E^2}{2}. \qquad (22)$$

The signal of expression (22) is applied to the positive input of a sixth summer means 74 having at its second positive input the signal of expression (15). Summer 74 develops an output signal on path 76 which is the quantity $P^2$.

The signal of expression (22) is also applied to the negative input of a seventh summer means 87 having at its positive input the signal of expression (15). Summer 87 develops an output signal on path 88 which is the quantity $\epsilon^2$.

The quantity $P^2$ from summer 74 is applied to a second HALF POWER means which is element HALF POWER 78 whose output is the quantity P. The quantity P is applied to a sixth scaler means 82 which develops the output quantity P (R.M.S.) on signal path 84 for the circuit arrangement 10.

The quantity $\epsilon^2$ from summer 87 is applied to a third HALF POWER means which is element HALF POWER 91 whose output is the quantity $\epsilon$. The quantity $\epsilon$ is applied to a seventh scaler means 94 which develops the output quantity ε (R.M.S.) on signal path 96 for the circuit arrangement 10.

An alternate embodiment of the RMS COMPOSITE CONTROLLER that being the RMS COMPOSITE CONTROLLER (B) 100 is shown in FIG. 4. The RMS COMPOSITE CONTROLLER (B) 100 of FIG. 4 is comprised of a plurality of elements whose reference numbers along with the circuit function performed are listed in Table 2.

TABLE 2

| Elements | Function |
|---|---|
| 102, 110, 118 and 126 | Summer |
| 132 | Multiplier |
| $106 \left( K\left(\frac{1}{3}\right) \right)$, and $122 \left( K\left(\frac{2}{3}\right) \right)$ | Scaler |
| 114 and 116 | Half Power |

The scalers of Table 2 have a scaling constant shown within their respective brackets.

The Half Power elements 114 and 116 of Table 2 may be of the type described for Half Power element 38 of my U.S. Pat. No. 4,143,315.

The RMS COMPOSITE CONTROLLER (B) 100 receives the applied signals $f_1^2$ (R.M.S.), $f_2^2$ (R.M.S.) and $f_3^2$ (R.M.S.) and $f_1$ (R.M.S.), $f_2$ (R.M.S.) and $f_3$ (R.M.S.) from RMS TRANSDUCERS 210, 240 and 270 and develops two output quantities $P_a$ (R.M.S.) and $\epsilon_a$ (R.M.S.). The term $P_a$ (R.M.S.) is means to represent an approximation to the R.M.S. of the positive sequence component of the three wavetrains $f_1(\omega t)$, $f_2(\omega t)$, and $f_3(\omega t)$. The term $\epsilon_a$ (R.M.S.) is meant to represent an approximation to the R.M.S. of the negative sequence component of the three wavetrains $f_1(\omega t)$, $f_2(\omega t)$ and $f_3(\omega t)$.

The signal $f_1$ (R.M.S.) may be expressed in terms of $\underline{V}_1$ by the square root function of expression (9) and which may be given as:

$$V_1 = \frac{1}{\sqrt{2}} [P^2 + 2PE\cos(\phi - \gamma) + E^2]^{\frac{1}{2}} \quad (23)$$

Similarly, the signal $f_2$ (R.M.S.) may be expressed in terms of $\underline{V}_2$ by the square root function of expression (10) and which is expressed as:

$$V_2 = \frac{1}{\sqrt{2}} [P^2 + PE(\sqrt{3}\sin(\phi - \gamma) - \cos(\phi - \gamma)) + E^2]^{\frac{1}{2}} \quad (24)$$

Still further, the signal $f_3$ (R.M.S.) may be expressed in terms of $\underline{V}_3$ by the square root function of expression (11) and which is expressed as:

$$V_3 = \frac{1}{\sqrt{2}} [P^2 - PE(\sqrt{3}\sin(\phi - \gamma) + \cos(\phi - \gamma)) + E^2]^{\frac{1}{2}} \quad (25)$$

The three signals given in equations (23), (24) and (25) are received from RMS TRANSDUCERS 210, 240 and 270 and each are respectively applied to the first, second and third positive inputs of a first summer means 118 which develops a first output signal whose quantity is given by the following expression:

$$3\underline{V} = \underline{V}_1 + \underline{V}_2 + \underline{V}_3 \quad (26).$$

The signal $3\underline{V}$ of expression (26) is applied to a first scaler means 122 which develops the output quantity $2\underline{V}$ on path 124.

The signals $f_1^2$ (R.M.S.), $f_2^2$ (R.M.S.) and $f_3^2$ (R.M.S.) received by the circuit arrangement 100 from RMS TRANSDUCERS 210, 240 and 270 may be respectively expressed as $\underline{V}_1^2$, $\underline{V}_2^2$ and $\underline{V}_3^2$ in a manner as described by squaring equations (23), (24) and (25). The three quantities $\underline{V}_1^2$, $\underline{V}_2^2$ and $\underline{V}_3^2$ are each applied to a first, second and third positive input of a second summer means 102, which develops a second output signal whose quantity is given by the following expression:

$$3\underline{V}^2 = \underline{V}_1^2 + \underline{V}_2^2 + \underline{V}_3^2 \quad (27)$$

The signal of expression (27) is routed to a second scaler means 106 which develops the output $\underline{V}^2$. The signal $\underline{V}^2$ is applied to a first half power means which is element HALF POWER 116, which, in turn, develops the quantity $\underline{V}$. The signal $\underline{V}$ is applied to the negative input of a third summer means 126 which has as its positive input the quantity $2\underline{V}$. The output of summer 126 is the quantity $P_a$ (R.M.S.) which may be expressed as:

$$P_a \text{ (R.M.S.)} = 2\underline{V} - \underline{V} \quad (28)$$

The quantity $P_a$ (R.M.S.) of expression (28) may be directly expressed as a very close aproximation to the positive sequence component P (R.M.S.) of the three phase voltage $f_1(\omega t)$, $f_2(\omega t)$ and $f_3(\omega t)$. The quantity $P_a$ (R.M.S.) is one of the output signals developed by the RMS COMPOSITE CONTROLLER (B) 100.

The other output quantity $\epsilon_a$ (R.M.S.) of the RMS COMPOSITE CONTROLLER (B) 100 is developed by the further application of $P_a$ (R.M.S.). The output quantity $P_a$ (R.M.S.) of summer 126 is applied to a first multiplier means 132, via signal path 130, which develops an output quantity $P_a^2$ (R.M.S.) The quantity $P_a^2$ (R.M.S.) is applied to a negative of a fourth summer means 110 having at its positive input the quantity $\underline{V}^2$. Summer 110 develops an output signal $\underline{V}^2 - \overline{P}_a^2$ (R.M.S.). The signal $\underline{V}^2 - P_a^2$ (R.M.S.) is applied to a second half power which is element HALF POWER 114 which, in turn, develops the output $\epsilon_a$ (R.M.S.) function of the RMS COMPOSITE CONTROLLER (B) 100.

In one embodiment of the present invention the REACTIVE CONVERTER 310 of FIG. 5 and also each of reactive converters 410 and 510 receives the signal $P_a$ (R.M.S.) developed by the RMS COMPOSITE CONTROLLER (B) 100 whereas in another embodiment of the present invention each of the REACTIVE CONVERTERS 310, 410, and 510 receive the signal P (R.M.S.) developed by the RMS COMPOSITE CONTROLLER (A) 10. The reactive converters 310, 410, and 510 are substantially identical, however, for the sake of clarity only reactive converter 310 is fully shown in FIG. 5.

The reactive converter 310 of FIG. 5 is substantially identical to my described reactive converter of FIG. 1 of U.S. Patent Application Ser. No. 242,784, previously incorporated by reference hereinbefore. The elements of circuit arrangement 310 of FIG. 5 are the same as those of FIG. 1 of U.S. Application Ser. No. 242,784, except that the reference numbers of reactive converter 310 in FIG. 5 have each been increased by a numerical value of 300. The circuit arrangement 310 operates in a manner as described hereinbefore for U.S. Application Ser. No. 242,784 with the exception that feedback signal P (R.M.S.) or feedback signal $P_a$ (R.M.S.) determines the operation of the reactive converter 310 of this invention. Further, the feedback signals P (R.M.S.) or $P_a$ (R.M.S.) applied to the reactive converter 310, coupled across phase A-B at the critical area 11, are a composite quantity of three (3) phase voltages at the critical area, whereas, the feedback signals of the reactive converter of my U.S. Application Ser. No. 242,784 are related to the individual phase voltages at a critical area. Still further, each of the reactive converters 410 and 510 respectively coupled across phases B-C and phases C-A at critical area 11, also receive the composite quantity P (R.M.S.) or $P_a$ (R.M.S.).

The description of the operation of the controller 310 of FIG. 5, and also reactive converters 410 and 510 generally shown in FIG. 5, is substantially that of my circuit arrangement shown as block diagram 10 of FIG. 1 of my U.S. Application Ser. No. 242,784. The primary difference is in the input stages of my U.S. Application Ser. No. 242,784 and this present invention. In my U.S. Application Ser. No. 242,784 my RMS TRANSDUCER 12 develops output signal 17 representative of the RMS value of the phase A to B voltage which is applied to summers 36, 42, and 44 while in my present invention the hereinbefore described signals P (R.M.S.) or $P_a$ (R.M.S.), shown in FIG. 5 as applied to signal path 317 and also to reactive converters 410 and 510, signal path 317 of FIG. 5 is routed to summers 336, 342, and 344. The description of the operation of block diagram 10 of U.S. Application Ser. No. 242,784 in response to the signal 17 is applicable to describe the operation of reactive converters 310, 410 and 510 in response to the applied signals $P_a$ (R.M.S.) or P (R.M.S.).

Reactive converters 310, 410 and 510 of FIG. 5 responds to the signal $P_a$ (R.M.S.) or P (R.M.S.) representative of the actual voltages at the critical area 11 and to the voltage levels desired for the critical area 11 so as to develop a control signal, such as the control signal 322 of reactive converter 310, to hold the actual and desired voltages of critical area 11 in close correspondence by the operation of the thyristor switched inductor circuits of reactive converters 310, 410 and 510. The actual and desired voltages of the critical area 11 are held in close correspondence both during normal and transient conditions of the power system. Each of the inductor circuits of reactive converters 310, 410 and 510 deliver a leading or lagging compensation current for regulating the reactive disturbances so as to provide good regulation for all three phases of the power system at the critical area 11.

The circuit arrangement of FIG. 5 in cooperation with the elements shown in FIG. 1, in particular, the RMS COMPOSITE CONTROLLER (A) 10 of FIG. 3 or the RMS COMPOSITE CONTROLLER (B) 100 of of FIG. 4 develop regulation so as to provide a leading or lagging compensating current for the compensation of positive sequence disturbances, which, in turn, provides good positive sequence regulation at the critical area 11. The RMS COMPOSITE CONTROLLER (A) 10 determines essentially precise values P (R.M.S.) and $\epsilon$ (R.M.S.) of the R.M.S. positive and negative sequence components, respectively, of wavetrains $f_1(\omega t)$, $f_2(\omega t)$, and $f_3(\omega t)$, whereas, the RMS COMPOSITE CONTROLLER (B) 100 determines approximate values of the R.M.S. positive and negative sequence components, respectively, $P_a$ (R.M.S.) and $\epsilon_a$ (R.M.S.) of wavetrains $f_1(\omega t)$, $f_2(\omega t)$ and $f_3(\omega t)$.

The approximate sequence components $P_a$ (R.M.S.) and $\epsilon_a$ (R.M.S.), the precise sequence components P (R.M.S.) and $\epsilon$ (R.M.S.) and an angle of displacement $(\phi - \gamma)$ of the positive sequence component $(\phi)$ and negative sequence component $(\gamma)$ angles that may be obtained are given in Table 3.

TABLE 3

| P(R.M.S.) | E(R.M.S.) | $(\phi - \gamma)$ | $P_a$(R.M.S.) | $E_a$(R.M.S.) |
|---|---|---|---|---|
| 1 | 0 | any angle | 1 | 0 |
| 1 | 0.05 | 0° | 1.000032 | 0.049350 |
| 1 | 0.05 | 60° | 0.999970 | 0.050601 |
| 1 | 0.10 | 0° | 1.000265 | 0.097317 |
| 1 | 0.10 | 60° | 0.999766 | 0.102310 |
| 1 | 0.20 | −15° | 1.001642 | 0.191602 |
| 1 | 0.20 | 0° | 1.002216 | 0.188580 |
| 1 | 0.20 | 15° | 1.001642 | 0.191602 |
| 1 | 0.20 | 30° | 1.000252 | 0.198737 |
| 1 | 0.20 | 45° | 0.998850 | 0.205665 |
| 1 | 0.20 | 60° | 0.998267 | 0.208479 |
| 1 | 0.20 | 75° | 0.998850 | 0.205665 |
| 1 | 0.50 | 0° | 1.036667 | 0.418715 |
| 1 | 0.50 | 60° | 0.930550 | 0.619740 |
| 1 | 1.00 | 0° | 1.252453 | 0.656781 |
| 1 | 1.00 | 60° | 0.895188 | 1.094824 |

The effects of the ratio of the negative sequence to the positive sequence component ($\epsilon$ (R.M.S.)/P (R.M.S.) relative to the $P_a$ (R.M.S.) and $\epsilon_a$ (R.M.S.) quantities and of the angle of displacement $(\phi - \gamma)$ are also shown in Table 3. For example, the percent error in the approximate R.M.S. positive sequence component $P_a$ (R.M.S.) may be expressed as:

$$\% \text{ error } P_a(R.M.S.) = \frac{P(R.M.S.) - P_a(R.M.S.)}{P(R.M.S.)} \times 100\% \quad (29)$$

From the Table 3 for the case that P (R.M.S.)=1, $\epsilon$ (R.M.S.) from 0 to 0.1, i.e., about 10% negative sequence component, and for range of displacement angles $(\phi - \gamma)$ from any angle ($\epsilon$ (R.M.S.) 0) to 60° ($\epsilon$ (R.M.S.) 0.10), the % error $P_a$ (R.M.S.) from equation 29 has a range of +0.0265% to −0.0234%. It follows that considering the high accuracy of the approximate method and the relative greater simplicity and lower cost of implementing the approximate method, that for example if the maximum expected negative sequence component is about 10%, that the approximate method, that in RMS COMPOSITE CONTROLLER (B) 100, is preferred. However, if for example a much greater than 10% negative sequence component $\epsilon$ (R.M.S.) is expected, the precise method that is RMS COMPOSITE CONTROLLER (A) 10 may be preferred since the accuracy of the approximate method is degraded as the percent negative sequence component $\epsilon$ (R.M.S.) is increased as seen from Table 3. The $\epsilon$ (R.M.S.) quantities of Table 3 are related to disturbances occurring within a power system. For example, for P (R.M.S.) of 1, of a disturbance in power system manifested as an imbalance between the phase-to-phase voltage of 16% typically corresponds to $\epsilon$ (R.M.S.) negative sequence quantity of 0.10 of Table 3.

It should now be appreciated that each of RMS COMPOSITE CONTROLLER (A) 10 and RMS COMPOSITE CONTROLLER (B) 100 develop accurate control signals, P (R.M.S.) and $P_a$ (R.M.S.) respectively. It should be noted that these signals P (R.M.S.) and $P_a$ (R.M.S.) are representative of the positive sequence component of the phase-to-phase voltages $f_1$ ($\omega t$), $f_2$ ($\omega t$), and $f_3$ ($\omega t$), and as such correspond to the positive sequence disturbance at the critical area 11. These signals are not representative of the negative sequence component of the phase-to-phase voltages $f_1$ ($\omega t$), $f_2$ ($\omega t$) and $f_3$ ($\omega t$) and as such do not correspond to the negative sequence disturbances at the critical area 11. These accurate signals P (R.M.S.) or $P_a$ (R.M.S.) are applied to the reactive converters 310, 410 and 510, which, in turn, respond to these signals P (R.M.S.) or $P_a$ (R.M.S.) to develop a leading or lagging compensation current to accurately regulate and correct for positive sequence distrubances manifested at the critical area 11.

Further, it should be appreciated, that the RMS COMPOSITE CONTROLLERS 10 and 100 of this invention need not be confined to use with only my type reactive controllers 310, 410 and 510 primarily described in my U.S. Application Ser. No. 242,784. For example, the RMS COMPOSITE CONTROLLERS 10 and 100 may be used with my RMS TRANSDUCER AND VOLTAGE REGULATING SYSTEM EMPLOYING THE SAME described in my previously mentioned and incorporated by reference U.S. Pat. No. 4,143,315. For such a usage the accurate control signals P (R.M.S.), $\epsilon$ (R.M.S.), $P_a$ (R.M.S.) or $\epsilon_a$ (R.M.S.) of RMS COMPOSITE CONTROLLERS 10 and 100 may be used in place of $\epsilon$ R.M.S. as the means for accurately controlling the thyristors and inductor branches of U.S. Pat. No. 4,143,315.

Still further, it should be appreciated that the RMS COMPOSITE CONTROLLERS 10 and 100 of the present invention need not be confined to a system for regulating system distrubances. For example, each of the RMS COMPOSITE CONTROLLERS 10 and 100 respectively may develop signals P (R.M.S.) and $\epsilon$ (R.M.S.), and $P_a$ (R.M.S.) and $\epsilon_a$ (R.M.S.) for monitoring purpose not controlling purposes. For such arrangements the signals P (R.M.S.), $\epsilon$ (R.M.S.), $P_a$ (R.M.S.) and $\epsilon_a$ (R.M.S.), all shown in FIG. 1, would be routed to the monitor 600 also shown in FIG. 1. Monitor 600 may then be used as a means for gathering data related to the positive and negative disturbances of the power system, such as to which the RMS COMPOSITE CONTROLLER 10 and 100 are coupled. The gathered data may in turn prove helpful for further developmental efforts related to power system disturbances.

While I have illustrated preferred embodiments of my invention, many modifications will occur to those skilled in the art, and I, therefore, wish to have it understood that I intend in the appended claims to cover all such modifications as fall within the true spirit and scope of my invention.

What I claim as new and desire to secure by Letters Patent of the United States is:

1. In a regulating system coupled to a three phase power system at a critical area, said regulating system having reactive converters respectively coupled across each of the phase-to-phase voltages of the three phase power system for delivering a leading or lagging current to compensate for a load of varying reactance, said regulating system comprising;

(a) means for developing a first signal representative of the R.M.S. value of the positive sequence component of the R.M.S. values of the phase-to-phase voltages of the three phase power system at the critical area;

(b) means for developing second signals representative of desired voltage regulation levels of each of the phase-to-phase voltages of the three phase power at the critical area;

(c) means responsive to said first and said second signals for developing error signals for said regulating system which are used to hold the first signal and second signals in close correspondence if within a desired range of the reactive converters;

(d) comparison means for sensing non-correspondence between said first signal and each of said second signals, and developing in dependence upon said sensed non-correspondence command signals indicative of whether normal or transient conditions are present in the power system;

(e) gating control means responsive to said command signals for supplying control signals for each of the reactive converters so as to regulate the voltage at said critical area both during normal and transient conditions;

(f) a first, a second and a third arrangement, each comprising two circuit branches connected in parallel, each branch comprising an inductor and a thyristor connected in series, said thyristors being oppositely poled and each of said thyristor providing a unidirectional path through its inductor; a capacitor connected in parallel with each of said two branches; said first, second, and third arrangements for two circuit branches being respectively connected between the first and second, second and third, and third and first phases of the three phase power system;

(g) said gating control means, (1) in effecting said voltage regulation during normal conditions, causing each of thyristors of each of the first, second and third arrangements to have a conduction angle of 180 degrees or less in response to said comparison means sensing the presence of normal power conditions in the power system, and (2) in effecting said voltage regulation during transient conditions, causing each of said thyristors to have a conduction angle of greater than 180 degrees in response to said comparison means sensing the presence of transient power conditions in the power system.

2. A regulating system according to claim 1 wherein said load of varying reactance is caused by positive sequence disturbances in said three phase power system.

3. A system according to claims 1 or 2, wherein said means for developing said first signal comprises;

(a) means for developing quantities $f_1^2$ (R.M.S.), $f_2^2$ (R.M.S.) and $f_3^2$ (R.M.S.), where $f_1$ (R.M.S.), $f_2$ (R.M.S.) and $f_3$ (R.M.S.) are signals representative of the respective phase-to-phase voltages of the three phase power system, and;

(b) means responsive to said quantities for developing said first signal.

4. A system according to claims 1 or 2, wherein said means for developing said first signal comprises;

(a) means for developing quantities $f_1$ (R.M.S.), $f_2$ (R.M.S.), $f_3$ (R.M.S.), $f_1^2$ (R.M.S.), $f_2^2$ (R.M.S.) and $f_3^2$ (R.M.S.), where $f_1$ (R.M.S.), $f_2$ (R.M.S.) and $f_3$ (R.M.S.) are signals representative of the respective phase-to-phase voltages of the three phase power system, and;
(b) means responsive to said quantities for developing said first signal.

5. A system for developing signals P (R.M.S.) and $\epsilon$ (R.M.S.) respectively representative of the R.M.S. value of the positive sequence component and the negative sequence component both of the R.M.S. values of the phase-to-phase voltages of a three phase power system, said system having applied quantities $f_1{}^2$ (R.M.S.) $f_2{}^2$ (R.M.S.), and $f_3{}^2$ (R.M.S.) where $f_1$ (R.M.S.), $f_2$ (R.M.S.) and $f_3$ (R.M.S.) are signals representative of the respective phase-to-phase voltages of the three phase power system, said system comprising;

(a) a first, a second, and a third scaling means each having a scaling factor of $\frac{1}{3}$ and each respectively receiving said quantities $f_1{}^2$ (R.M.S.), $f_2{}^2$ (R.M.S.) and $f_3{}^2$ (R.M.S.), said first, second and third scaling means respectively developing signals $F_A$, $F_B$, and $F_C$;

(b) a first summing means having a first, second and a third positive input for respectively receiving said signals $F_A$, $F_B$, and $F_C$, said first summing means developing a signal represented by the expression;

$$F_{ABC} = \frac{P^2}{2} + \frac{E^2}{2}$$

where P and $\epsilon$ are respectively the positive and negative sequence components of the signals $f_1$ (R.M.S.), $f_2$ (R.M.S.) and $f_3$ (R.M.S.);

(c) a fourth scaling means having a scaling factor of 3 and receiving said signal $F_A$, said fourth scaling means developing a signal $3F_A$;

(d) a second summing means having a negative input for receiving said $F_C$ signal and a positive input for receiving said $F_B$ signal, said second summing means developing a signal $F_B - F_C$;

(e) a fifth scaling means having a scaling factor of $\sqrt{3}$ and receiving said $F_B - F_C$ signal, said fifth scaling means developing a signal represented by the expression;

$$P\epsilon \sin(\phi - \gamma)$$

where $\gamma$ in the angle related to the positive sequence component P and $\phi$ is the angle related to the negative sequence component $\epsilon$;

(f) a third summing means having a positive input for receiving said signal $3F_A$ and a negative input for receiving said signal $F_{ABC}$, said third summing means developing a signal represented by the expression;

$$F_D = P\epsilon \cos(\gamma - \phi)$$

(g) a first and second multiplying means and a fourth summing means, said first multiplying means receiving and multiplying said $P\epsilon \sin(\phi - \gamma)$ by itself and developing an output signal which is applied to a first positive input of said fourth summing means, said second multiplying means receiving and multiplying said $F_D$ signal by itself and developing an output signal which is applied to a second positive input of said fourth summing means, said fourth summing means developing an output signal represented by the expression $F_Q = P^2 \epsilon^2$;

(h) a third multiplying means for receiving and multiplying said $F_{ABC}$ signal by itself so as to develop a signal represented by the expression $$\frac{P^4}{4} + \frac{P^2 E^2}{2} + \frac{E^4}{4};$$

(i) a fifth summing means having a positive input for receiving said $$\frac{P^4}{4} + \frac{P^2 E^2}{2} + \frac{E^4}{4}$$

signal and a negative input for receiving said $F_Q$ signal, said fifth summing means developing a signal represented by the expression $$\frac{P^4}{4} - \frac{P^2 E^2}{2} + \frac{E^4}{4};$$

(j) a first half power means for developing an output signal representative of the square root of an applied signal, said first half power means receiving said $$\frac{P^4}{4} - \frac{P^2 E^2}{2} + \frac{E^4}{4}$$

signal so as to develop a signal $$\frac{P^2}{2} - \frac{E^2}{2};$$

(k) a sixth summing means having a first positive input for receiving said $$\frac{P^2}{2} - \frac{E^2}{2}$$

signal and a second positive input for receiving said $F_{ABC}$ signal so as to develop a signal $P^2$;

(l) a second half power means for receiving said $P^2$ signal and developing an output signal P which is applied to a sixth scaling means having a scaling factor of $$\frac{1}{\sqrt{2}},$$

said sixth scaling means developing said P (R.M.S.) signal;

(m) a seventh summing means having a negative input for receiving said $$\frac{P^2}{2} - \frac{E^2}{2}$$

signal and a positive input for receiving said $F_{ABC}$ signal so as to develop a signal $\epsilon^2$;

(n) a third half power means for receiving said $\epsilon^2$ and developing an output signal $\epsilon$ which is applied to a seventh scaling means having a scaling factor of $$\frac{1}{\sqrt{2}},$$

said seventh scaling means developing said $\epsilon$ (R.M.S.) signal.

6. A system for developing signals $P_a$ (R.M.S.) and $\epsilon_a$ (R.M.S.) respectively representative of the R.M.S. value of the positive sequence component and the negative sequence component both of the phase-to-phase voltages of a three phase power system, said system having applied quantities $f_1$ (R.M.S.), $f_2$ (R.M.S.), $f_3$ (R.M.S.), $f_1^2$ (R.M.S.), $f_2^2$ (R.M.S.), and $f_3^2$ (R.M.S.), where $f_1$ (R.M.S.), $f_2$ (R.M.S.), and $f_3$ (R.M.S.) are signals representative of the respective phase-to-phase voltages of the three phase power system, said system comprising;

(a) a first summing means having a first, a second and a third positive input respectively receiving said quantities $f_1$ (R.M.S.), $f_2$ (R.M.S.) and $f_3$ (R.M.S.), said first summing means developing a first output signal representative of the sum of said receiving quantities;

(b) a first scaling means for receiving said first output signal and having a scaling factor of $\frac{2}{3}$, said first scaling means developing an output signal 2 V;

(c) a second summing means having a first, a second, and a third positive input respectively receiving said quantities $f_1^2$ (R.M.S.), $f_2^2$ (R.M.S.) and $f_3^2$ (R.M.S.), said second summing means developing a second output signal representative of the sum of said received quantities;

(d) a second scaling means for receiving said second output signal and having a scaling factor of $\frac{1}{3}$, said second scaling means developing an output signal $V^2$;

(e) a first half power means for developing an output signal representative of the square root of an applied signal, said first power means receiving said $V^2$ signal so as to develop a V signal;

(f) a third summing means having a positive input for receiving said 2 V signal and a negative input for receiving said V signal, said third summing means developing said signal $P_a$ (R.M.S.);

(g) a first multiplying means for receiving and multiplying by itself said $P_a$ (R.M.S.) signal, said first multiplying means developing an output signal $P_a^2$ (R.M.S.);

(h) a fourth summing means having a positive input for receiving said $V^2$ signal and a negative input for receiving said $P_a^2$ (R.M.S.) signal, said fourth summing means developing an output signal $V^2 - P_a^2$ (R.M.S.);

(i) a second half power means for receiving said $V^2 - P_a$ (R.M.S.) signal and developing said signal $\epsilon_a$ (R.M.S.).

* * * * *